(12) United States Patent
Minami et al.

(10) Patent No.: US 8,324,749 B2
(45) Date of Patent: Dec. 4, 2012

(54) WIND TURBINE GENERATOR AND SOUNDNESS DIAGNOSIS METHOD THEREOF

(75) Inventors: Tohru Minami, Tokyo (JP); Yuji Yatomi, Tokyo (JP); Hideto Doi, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/675,258

(22) PCT Filed: Feb. 22, 2010

(86) PCT No.: PCT/JP2010/052657
§ 371 (c)(1),
(2), (4) Date: Aug. 2, 2010

(87) PCT Pub. No.: WO2011/101995
PCT Pub. Date: Aug. 25, 2011

(65) Prior Publication Data
US 2011/0304140 A1    Dec. 15, 2011

(30) Foreign Application Priority Data
Feb. 22, 2010  (WO) .................. 2010/052657

(51) Int. Cl.
*F03D 11/00*    (2006.01)
(52) U.S. Cl. .......................... 290/44; 290/55
(58) Field of Classification Search ............ 290/44, 290/55
See application file for complete search history.

(56) References Cited

U.S. PATENT DOCUMENTS
4,487,226 A    12/1984  Chun

| | | |
|---|---|---|
| 2009/0185902 A1 | 7/2009 | Romero Vergel et al. |
| 2009/0259429 A1* | 10/2009 | Elisiussen ............... 702/113 |
| 2010/0014972 A1 | 1/2010 | Steffensen |
| 2010/0232964 A1 | 9/2010 | Geiger |
| 2011/0142640 A1 | 6/2011 | Kamata et al. |

FOREIGN PATENT DOCUMENTS

| | | |
|---|---|---|
| AU | 2009338345 A1 | 7/2010 |
| JP | 63192968 A | 8/1988 |
| JP | 7042662 A | 2/1995 |
| JP | 2002364516 A | 12/2002 |
| JP | 2005030264 A1 | 2/2005 |
| JP | 2005030265 A | 2/2005 |
| JP | 2007-107410 A | 4/2007 |
| JP | 2009526164 A | 7/2009 |
| WO | 2009064264 A1 | 5/2009 |

OTHER PUBLICATIONS

ISR for PCT/JP2010/052657 dated May 25, 2010.
Notice of Acceptance for AU2010201622 mailed Jul. 6, 2011.
IPER and Written Opinion for PCT/JP2010/052657 dated Sep. 7, 2012.
Canadian Office Action for 2,696,073 dated Oct. 4, 2012.

* cited by examiner

*Primary Examiner* — Tho D Ta
(74) *Attorney, Agent, or Firm* — Kanesake Berner and Partners LLP (57) ABSTRACT

An accumulator is provided in an oil circuit of the pressure supply device and has a gas chamber for storing the pressure generated by the oil pump. A gas pressure judgment unit judges a soundness on the gas pressure of the gas chamber of the accumulator. A pitch movement judgment unit judges whether the pitch movement is performed soundly by the oil pressure accumulated in the accumulator if the gas pressure judgment unit judges that the gas pressure is sound. A start judgment unit judges a start condition to start the gas pressure judgment unit every predetermined period or when a start switch is operated.

10 Claims, 8 Drawing Sheets

FIG. 10
Prior Art ns of WIND TURBINE GENERATOR AND
SOUNDNESS DIAGNOSIS METHOD
THEREOF

RELATED APPLICATIONS

The present application is national phase of and claims priority to PCT/JP2010/52657 filed Feb. 22, 2010, the disclosure of which is hereby incorporated by reference herein in its entirety.

BACKGROUND OF THE INVENTION

1. Field of the Invention

The present invention relates to a soundness diagnosis method and a wind turbine generator for performing the soundness diagnosis method, which can decrease a risk of abnormal working of the wind turbine generator as possible. In particular, the invention relates to a soundness diagnosis method and a wind turbine generator for performing the soundness diagnosis method, which can diagnose for a soundness of inner pressure of an accumulator for securing control oil pressure in emergency or pitch movement of blades of the wind turbine generator.

2. Description of the Related Art

In recent years, a wind turbine generator has been developed as a power generator utilizing clean energy. The wind turbine generator includes a plurality of blades provided at an end of a rotational shaft and a generator connected to the rotational shaft via a speed increasing gear, whereby wind power acts on the blades to rotate the generator via the rotational shaft so that the generator generates electricity.

In the wind turbine generator, it is well known that an oil pressure supply device includes an accumulator in its oil pressure supply line as a backup in the trouble, i.e., as an interlock mechanism (safety arrangement).

Figure 10:
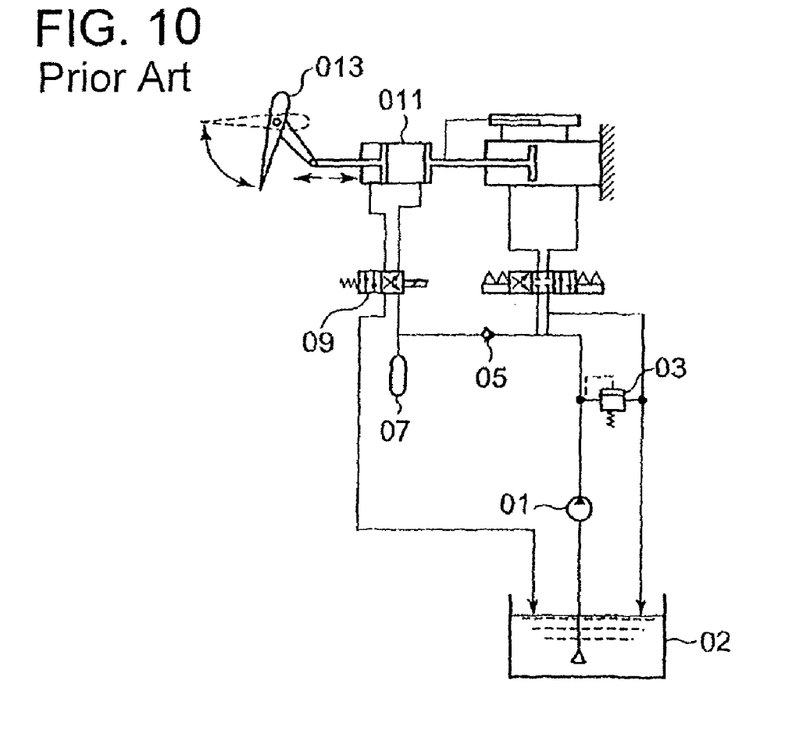
FIG. 10 is a diagram showing the prior art.

For example, Japanese Unexamined Patent Application Publication No. S63-192968 (Patent Publication 1) shows in its FIG. 10 an arrangement in which the oil pump 01 pressurizes oil within the oil tank 02, and the oil is regulated to the predetermined pressure by the oil pressure regulating valve 03. Then, the regulated oil is normally accumulated in the accumulator 07, while the regulated oil is supplied to the emergency stop oil pressure cylinder 011 through the magnet switching valve 09. In case of the electric power failure, the oil pressure circuit is automatically switched so as to supply the oil accumulated in the accumulator 07 to the emergency stop oil pressure cylinder 011, whereby the piston is moved toward the left side in the drawing to move the blade angle of the blade 013 to the stop side of the wind turbine.

SUMMARY OF THE INVENTION

However, even provided with the accumulator as disclosed in the Patent Publication 1, if partition wall of a gas chamber constituting the accumulator breaks and gas leak occurs, there is a risk that the blade angle cannot be controlled in emergency.

For example, in case of the electric power failure under the strong wind, it is required to feather the blades to prevent the blades from rotating at the speed higher than the allowable speed. In such case, the gas pressure of the accumulator is used to feather the blades, because the oil pump as an oil pressure source cannot be driven. However, if the gas pressure of the accumulator is low, the measurement in an emergency is not taken, that is, the blades cannot be feathered. In case that there is mechanical fastening to disable the blades from moving to the close position within a predetermined time period, even if the gas pressure is normal, it does not work enough as a measurement in an emergency.

Accordingly, the present invention was made to solve the above problems, by providing a wind turbine generator and a diagnosis method thereof, which diagnoses the soundness of an accumulator provided in the oil passage of the oil pressure supply device as an interlock mechanism (safety arrangement) for the oil pressure supply device and the soundness of the pitch movement of the blades are diagnosed so that the pitch control can normally work by the gas pressure of the accumulator in emergency, whereby the risk such that the measurement in an emergency cannot be taken is reduced, and therefore the reliability of the operation of the wind turbine generator can be improved.

The first invention is a wind turbine generator including an pitch control unit having an oil actuator for controlling a pitch of the blades, a pressure supply device for supplying operating oil to the oil actuator, and an accumulator provided in an oil circuit of the pressure supply device and having a gas chamber for accumulating the pressure generated by the oil pump, comprising a soundness diagnosis device, wherein the diagnosis device includes: a gas pressure judgment unit for judging soundness on the gas pressure of the gas chamber of the accumulator; a pitch movement judgment unit for judging soundness of the pitch movement of the pitch control unit by the pressurized operating oil accumulated in the accumulator when the gas pressure judgment unit judges that the gas pressure is sound; a start judgment unit for judging a start condition to start the gas pressure judgment unit every predetermined period or when a start switch is operated.

According to the first invention, the start condition is judged to start the gas pressure judgment unit every predetermined period or when a start switch is operated. If the gas pressure is judged normal by the gas pressure judgment unit, then the pitch movement judgment unit judges whether the pitch movement of the blades normally moves, whereby the decreasing of the gas pressure of the accumulator and an occurrence of the mechanical fastening of the blades can be diagnosed.

As a result, for example, when it is required to feather the blades to avoid the blades from rotating at the speed higher than the allowable speed in case of the electric power failure under the strong wind, namely, when the gas pressure of the accumulator is used to feather the blades because the oil pump as an oil pressure source cannot be driven, the blades can be normally feathered using the gas pressure of the accumulator, whereby the reliability of the function in an emergency can be improved.

Preferably, the gas pressure judgment unit judges soundness of the gas pressure based on the time period from time that the oil pump was stopped to time that the oil pressure decreased to a predetermined pressure.

If the time period is shorter than a threshold time period, the decreasing rate of the oil pressure is judged large, that is, the gas pressure within the gas chamber of the accumulator is leaked, therefore judging the accumulating function is not normal.

The gas pressure judgment may judge soundness on the gas pressure of the gas chamber based on the oil pressure value when a predetermined time period elapsed after the oil pump was stopped.

In such case, for example, if the pressure value detected by an oil pressure sensor provided in the oil passage near the accumulator is decreased under a threshold pressure 120 seconds after stopping the pump, the gas pressure judgment unit judges the decreasing rate of the oil pressure caused by the oil return to the operating oil tank is large and therefore an accumulating function of the accumulator is not in the normal state. Thus, the state of the gas pressure can be judged without complicating the soundness diagnosis apparatus, since the gas pressure judgment judges based on the decreasing state of oil pressure.

Preferably, the gas pressure judgment unit judges soundness of the gas pressure under conditions in which a yaw brake device for braking yaw movement of a nacelle, a main shaft brake for braking a rotational shaft of a rotor, and the oil actuator of the pitch control unit are stopped to be supplied the oil pressure.

Thus, the decreasing state of the oil pressure responding to the oil return to the oil tank is judged under the same condition in which supply of the oil pressure to the yaw brake device for braking the yaw rotation, the main shaft brake device and the pitch drive cylinder of the pitch control unit is stopped, and thereby the gas pressure judgment unit can judge the deterioration of the accumulating performance of the accumulator caused by leakage of the gas pressure from the gas chamber, more accurately.

The pitch movement judgment unit may judge soundness of the pitch movement of the pitch control unit based on the moving time that the blades are moved by the accumulated pressure of the accumulator from full open state after the oil pump was stopped to full close state.

Specifically, the pitch movement judgment unit can judge the movement of the blades is in abnormal state if the changing amount of the pitch angle of the blades toward the closing direction does not reach over a threshold angle, for example, 10 seconds after stopping the oil pump. The pitch movement judgment is executed only when the gas pressure of the gas chamber of the accumulator is judged to be in normal state, and thereby only the soundness of the pitch movement of the blades, namely only the mechanical fastening of the blades can be judged accurately.

Preferably, each rotational surface of the blades is placed in parallel with the wind, and a yaw brake for braking a yaw movement of a nacelle and a main shaft brake for braking a rotational shaft of a rotor are turned ON, when the pitch movement judgment unit judges a soundness of the pitch movement.

Thus, each rotational surface of the blades is placed in parallel with the wind so that the blades can ward off the wind, and further the yaw brake device and the main shaft brake device are turned on. Accordingly, the influence of the wind against the pitch motion of the blades and the influence of the rotation of the rotor are decreased as much as possible, and therefore an accurate judgment of the pitch movement can be realized.

The second invention is a soundness diagnosis method for a wind turbine generator including a pitch control unit having an oil actuator and an oil supply device for supplying operating oil to the oil actuator of the pitch control unit, comprising: a start judgment step of judging a start condition to start the gas pressure judgment unit every predetermined period or when a start switch is operated; a gas pressure judgment step of judging soundness on the gas pressure of a gas chamber of an accumulator provided in an oil circuit of the pressure supply device and having a gas chamber for accumulating the pressure generated by an oil pump of the oil supply device if the diagnosis of the soundness is started in the start judgment step; a pitch movement judgment step of judging soundness of the pitch movement of the pitch control unit by the pressurized operating oil accumulated in the accumulator if the gas pressure is judges sound in the gas pressure judgment step.

According to the second invention, the start condition is judged to start the gas pressure judgment unit every predetermined period or when a start switch is operated. If the gas pressure is judged normal by the gas pressure judgment unit, then the pitch movement judgment whether the pitch movement of the blades normally moves is executed in the gas pressure judgment step. Accordingly, for example, when it is required to feather the blades to avoid the blades from rotating at the speed higher than the allowable speed in case of the electric power failure under the strong wind, namely, when the gas pressure of the accumulator is used to feather the blades because the oil pump as an oil pressure source cannot be driven, the blades can be normally feathered using the gas pressure of the accumulator, whereby the reliability of the function in an emergency can be improved.

Preferably, in the gas pressure judgment step, oil supply to a yaw brake device for braking yaw movement of a nacelle, a main shaft brake for braking a rotational shaft of a rotor, and the oil actuator of the pitch control unit is blocked, then the oil pump is stopped and the soundness of the gas chamber is judged based on the time period from the time point when the oil pump was stopped to the time point when the oil pressure decreased to a predetermined pressure.

Thus, soundness of the gas pressure is judged based on the time period after stopping the oil pump, and therefore the leakage of the gas pressure of the accumulator is judged accurately.

Further, the decreasing state of the oil pressure responding to the oil return to the oil tank can be judged under the same condition in which supply of the oil pressure to the brake devices and the pitch drive cylinder of the pitch control unit is stopped, and thereby the gas pressure judgment unit can judge the deterioration of the accumulating performance of the accumulator caused by leakage of the gas pressure from the gas chamber, more accurately.

Preferably, in the gas pressure judgment step, oil supply to a yaw brake device for braking yaw movement of a nacelle, a main shaft brake for braking a rotational shaft of a rotor, and the oil cylinder of the pitch control unit is blocked, then the oil pump is stopped and the soundness of the gas chamber is judged based on the oil pressure value when a predetermined time period elapsed after the oil pump was stopped.

In such case, for example, if the pressure value detected by an oil pressure sensor provided in the oil passage near the accumulator is decreased under a threshold pressure 120 seconds after stopping the pump, the gas pressure judgment unit judges the decreasing rate of the oil pressure caused by the oil return to the operating oil tank is large and therefore an accumulating function of the accumulator is not in the normal state. Thus, the state of the gas pressure can be judged without complicating the soundness diagnosis apparatus, since the gas pressure judgment judges based on the decreasing state of oil pressure.

Preferably, in the pitch movement judgment step, each rotational surface of the blades is placed in parallel with the wind so that the blades can ward off the wind, and a yaw brake for braking a yaw movement of a nacelle and a main shaft brake for braking an rotational shaft of an rotor are turned ON, and the blades are moved to its full open position by the oil pressure of the oil pump, then while the pump is stopped and the blades are moved to its full close position by the oil pressure accumulated in the accumulator, the soundness of the pitch movement is judged based on the time period in which the blades are moved from the full open position to the full close position.

Thus, each rotational surface of the blades is placed in parallel with the wind so that the blades can ward off the wind, and further the yaw brake for braking the yaw movement of the nacelle and the main shaft brake for braking the rotational shaft are turned ON, and the blades are changed to its full open position by the oil pressure of the oil pump, then while the pump is stopped and the blades are changed to its full close position by the oil pressure accumulated in the accumulator, the soundness of the pitch movement is judged based on the time period in which the blades are changed from the full open position to full close position, thereby the influence of the wind against the pitch motion of the blades and the influence of the rotation of the rotor are decreased as much as possible, and therefore the accurate soundness of the pitch movement of the blades, namely only the mechanical fastening of the blades can be judged in the pitch movement judgment step.

According to the present invention, while the accumulator is provided as an interlock mechanism (safety arrangement) in the oil passage of the oil pressure supply device, the soundness of the accumulator and the soundness of the pitch movement of the blades are diagnosed. Thus, the pitch closing function can normally work by the gas pressure of the accumulator in emergency, and thereby the risk such that the pitch closing control cannot work normally in emergency is reduced. Accordingly, the reliability of the operation of the wind turbine generator can be improved.

DETAILED DESCRIPTION OF THE PREFERRED EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present invention.

First, an example of a wind turbine generator will be described, and then a soundness diagnosis apparatus according to the present invention will be described in detail.
(Over all Construction)

Figure 1:
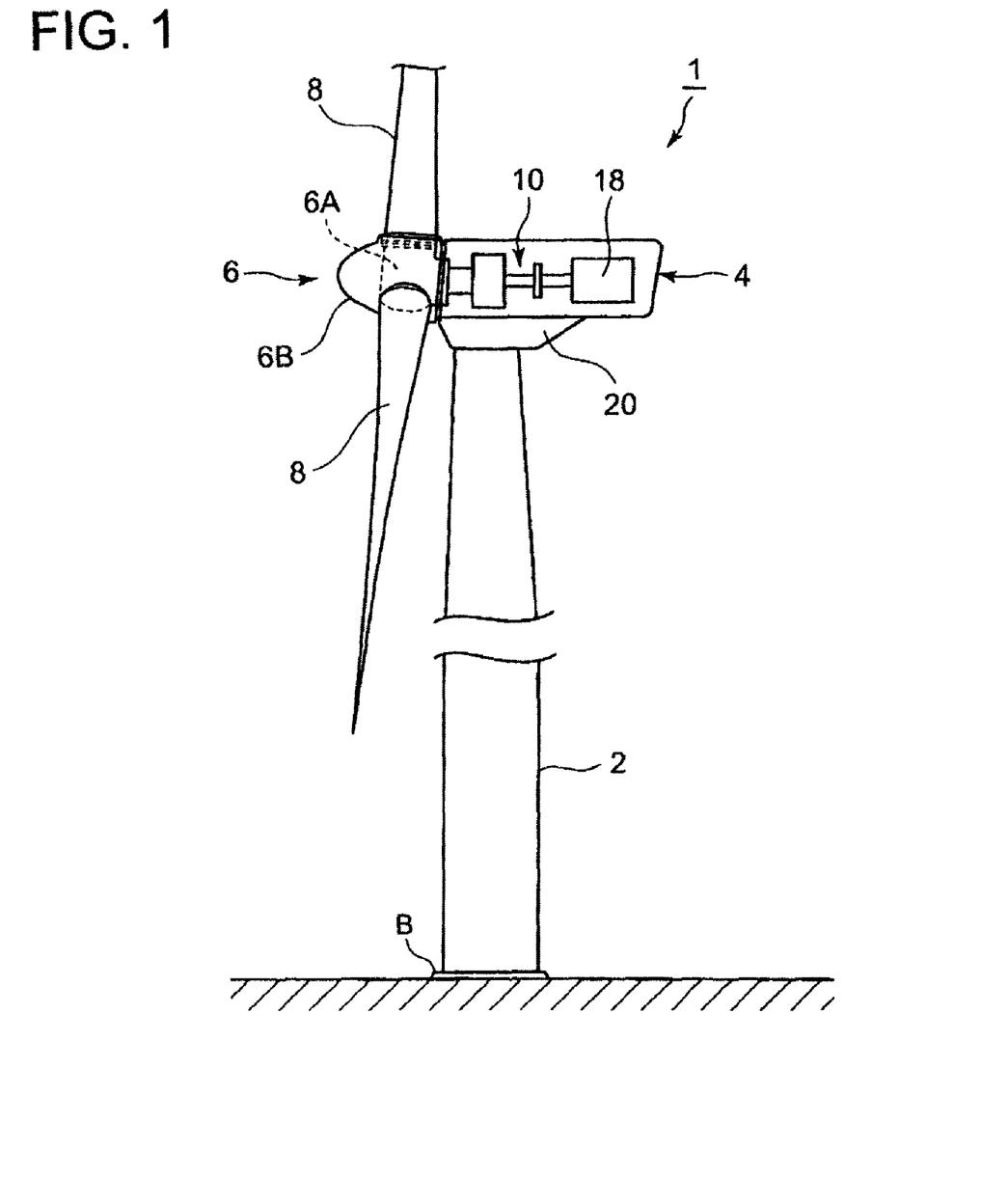
FIG. 1 is a diagram showing an example of the overall construction of a wind turbine generator according to an embodiment of the present invention.

FIG. 1 is a diagram showing an example of the overall construction of a wind turbine generator according to the embodiment. A wind turbine generator 1 mainly includes, as shown in FIG. 1, a tower 2 provided to stand on a foundation B, a nacelle 4 provided on the upper end of the tower 2, a rotor head 6 provided on the nacelle 4, and a plurality of blades 5 attached to the rotor head 6.

As shown in FIG. 1, the tower 2 has a column-like shape extending upwardly from the foundation B. The tower 2, for example, can be made from a single column-like member or made from a plurality of units aligned in upright direction and coupled each other. If the tower 2 is made from the plurality of units, the nacelle 4 is provided on the unit located on the top of the tower 2.

The nacelle 4 supports the rotor head 6 and accommodates a drive train 10 and a generator 18, etc.

Figure 2:
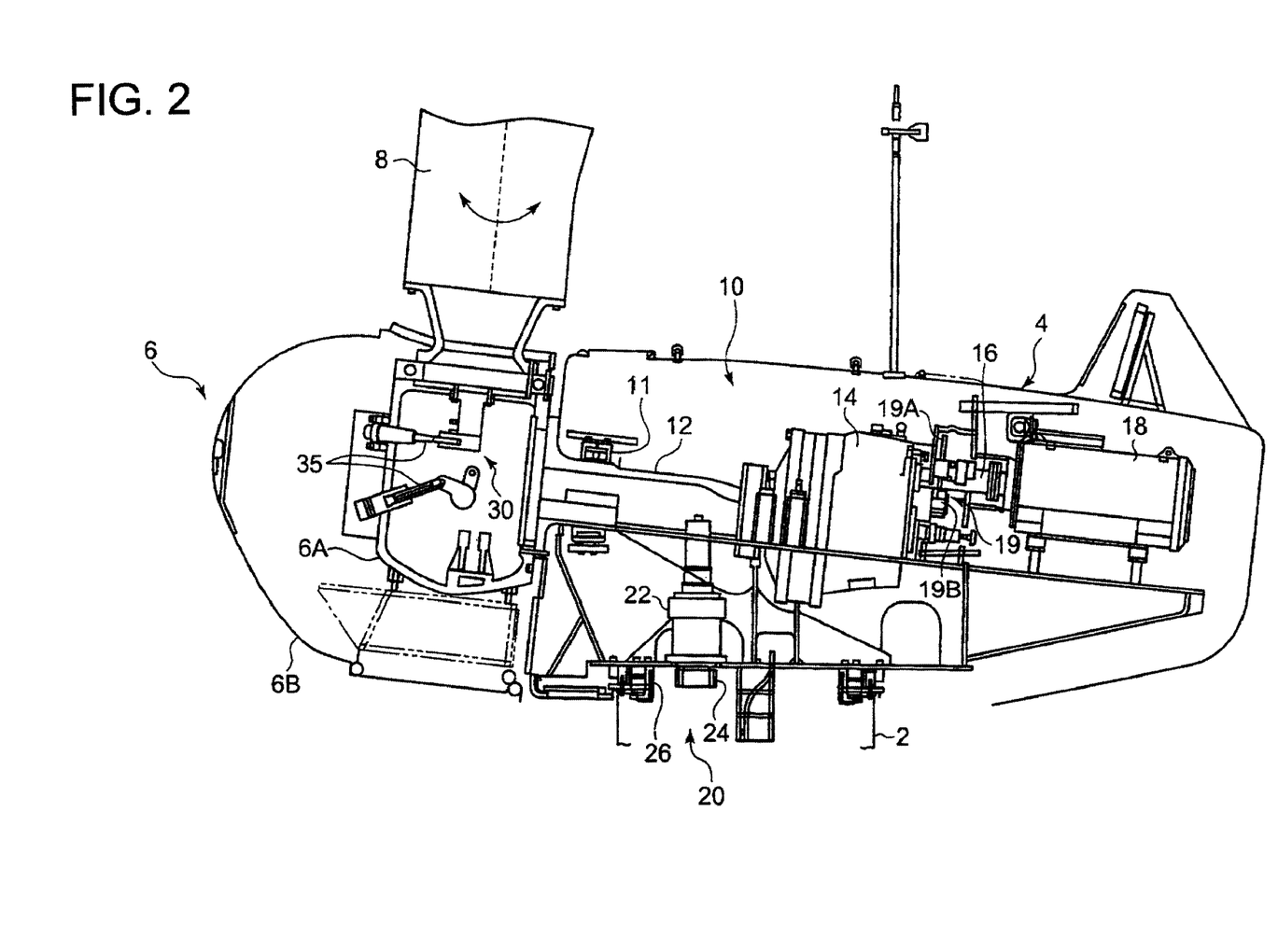
FIG. 2 is a sectional view showing a drive train and a generator provided within a nacelle.

FIG. 2 is a perspective view showing the detail of the inside of the nacelle 4. The drive train 10 includes, as shown in FIG. 2, a main shaft 12 connected to a rotor hub 6A of the rotor head 6, a speed increasing gear 14 coupled to the main shaft 12, and a coupling 16 for coupling the speed increasing gear 14 to the generator 18.

The main shaft 12 is connected to the rotor hub 6A of the rotor head 6 and rotatably supported to the casing side by a main bearing 11 so that the main shaft 12 can be rotated with the blades 8. The upper part of the main bearing 11 includes a grease supply port (not shown).

The speed increasing gear 14 is provided between the main shaft 12 and the coupling 16, and increases the rotational speed input from the rotor head 6 side to output to the coupling 16. The speed increasing gear 14 is not limited a special type of mechanism, but, for example, can be composed by combination of a planetary gear type mechanism and a spur gear type mechanism (both of them are not shown). This speed increasing gear 14, for example, increases the rotational speed approximate 20 rpm input through the main shaft 12 from the rotor head 6 up to the rotational speed approximate 1800 rpm, then outputs to the generator 18 through the coupling 16.

The coupling 16 is for coupling a final output shaft of the speed increasing gear 14 and an input shaft of the generator 18. For example, a flexible coupling or a swivel coupling can be used as the coupling 16, whereby the coupling 16 can absorb a misalignment between a final output shaft of the speed increasing gear 14 and an input shaft of the generator 18.

The coupling 16 is equipped with a main shaft brake device 19 including a brake disk 19A and brake pads 19B. This brake device 19 can brake the coupling 16 by pushing the brake pads 19B against the surface and reverse of the brake disk 16A so that the brake pads 19B pinch the brake disk. Instead, the brake device 19 can include a spring (not shown) to normally force the brake pads 19B to be pushed to the brake disk 19A, and a actuator (not shown) to release the brake pads from the brake disk 19A against the spring force when the wind turbine generator 1 is under normal operation.

Normally, when the brake is applied to the wind turbine generator, braking by pitch control mentioned later is a main brake and braking by the main shaft brake device 19 is auxiliary. That is, when the rotational shaft is stopped in order to secure the safety in maintenance of the wind generator or under strong wind, the blades 8 are feathered by the pitch control at first to reduce the rotational speed of the rotational shaft, then the brake is applied by the main shaft brake device 19 to stop the rotational shaft completely.

A nacelle rotating mechanism 20 for rotating the nacelle 4 in the yaw direction is provided on a lower part of the nacelle 4. As shown in FIG. 2, for example, the nacelle rotating mechanism 20 includes a yaw motor 22, a pinion 24 rotated by driving of the yaw motor 22, an internal gear 26 meshed with the pinion 24. Thus, if the yaw motor 22 is driven, the pinion 24 is rotated so that the nacelle 4 can rotate in the yaw direction.

As shown in FIGS. 1 and 2, the rotor head 6 is rotatably supported on the nacelle 4 with a rotation axis substantially extending horizontal direction, and includes a rotor hub 6A equipped with blades 8 and a head capsule 6B for covering this rotor hub 6A.

The rotor hub 6A is equipped with a pitch control unit 30 for rotating the blades 8 around its axis (a direction designated by an arrow in FIG. 4) so as to vary the pitch angle of the blades 8. The pitch control unit 30 is controlled by supply oil pressure to and exhausted oil pressure from a pitch driving cylinder 33 as the oil actuator of the invention, and the pitch driving cylinder 33 is interconnected with the blades 8 via a link mechanism 35 so as to control the pitch angle of the blades.

(Oil Pressure Supply Device)

Figure 3:
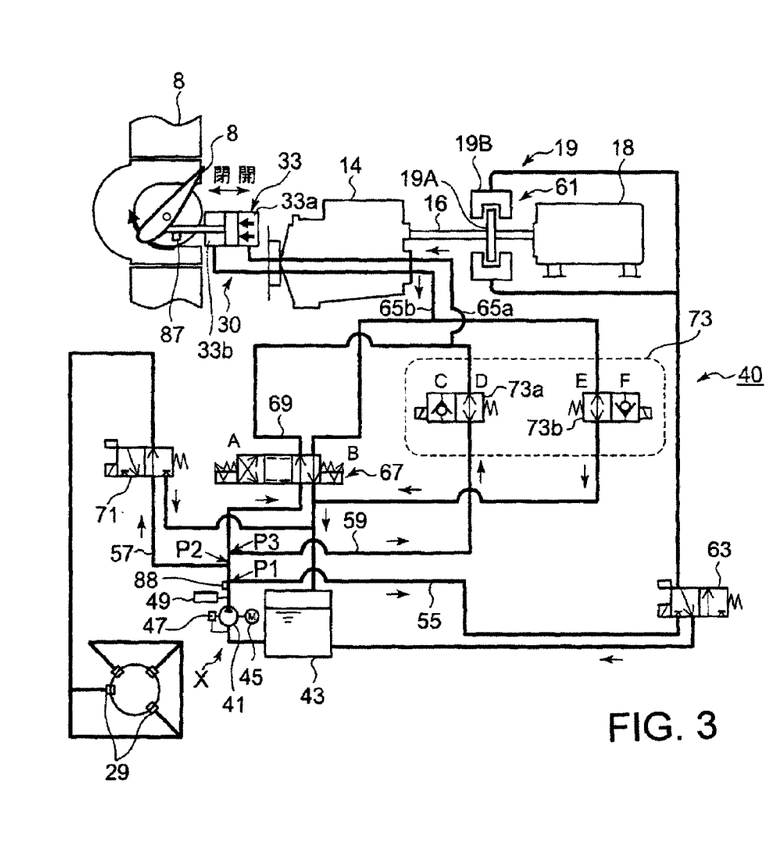
FIG. 3 is a diagram showing the overall construction of an oil pressure supply device.
Figure 4:
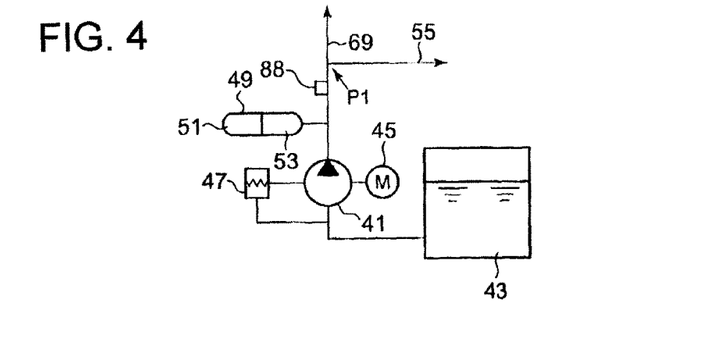
FIG. 4 is an enlarged view of the portion X of FIG. 3.

Next, an oil pressure supply device 40 of the wind turbine generator 1 will be described. In FIG. 3, an oil pump 41 feeds operating oil from an operating oil tank 43. The oil pump 41 is driven by a motor 45. The pressurized oil is regulated by a regulator valve 47, and the regulated oil is accumulated in an accumulator 49 while being fed. The accumulator 49 includes a gas chamber 51 filled with gas (for example, nitrogen gas) of a predetermined pressure and an oil chamber 53 divided with the gas chamber 51 by a partition and storing operating oil. Therefore, the gas chamber 51 is expanded or contracted responding to changes of the pressure within the oil chamber 53. An enlarged view of the portion X of the accumulator 49 is shown in FIG. 4.

The accumulator 49 can temporarily supply the operating oil to the each device as an emergency measure when the pump is stopped by an electric power failure in some emergency. Thus, the accumulator 49 is positioned near the downstream side of oil pump 41.

The operating oil fed by the oil pump is branched in branch portions P1, P2, P3 to be supplied to each supply pipe 55, 57, 59.

The supply pipe 55 is connected to a brake unit 61 constituting the main shaft brake device 19, whereby the oil pressure is supplied to the brake unit 61 so that the brake pads 19B are pushed against the surface and reverse of the brake disk 19A to brake the coupling 16.

A main shaft brake control valve 63 is provided in the supply pipe 55. The main shaft brake control valve 63 controls supply and release of the oil pressure of the brake unit 61.

The operating oil returns to the oil tank 43 via a return pipe connected to the main shaft brake control valve 63 when the oil pressure is released.

A supply pipe 65a and an oil return pipe 65b are connected to the pitch driving cylinder 33, respectively, and the supply pipe 65a and the oil return pipe 65b are connected to the pitch control valve 67. Thus, when the pitch control valve 67 is driven to selectively supply operating oil from the supply pipe 69 to any of the oil supply pipe 65a or the oil return pipe 65b, the pitch driving cylinder 33 is driven to change the pitch angle of the blades 8.

The supply pipe 57 is branched, and each branched pipe is connected to the yaw brake device 29. A yaw brake control valve 71 is provided in the supply pipe 57 to control supply of the operating oil to the yaw brake device 29, whereby the brakes applied by the yaw brake device 29 is selectively activated or released. The operating oil returns to the operating oil tank 022 via a return pipe when the yaw brake 29 is released.

Further, the wind turbine generator 1 includes an emergency control valve 73 (a first emergency valve 73a, a second emergency valve 73b) working when the oil pump is stopped by an electric power failure, etc. For example, it is required to feather the blades 8 to avoid the blades from rotating at the speed higher than the allowable speed in case of such strong wind and an electric power failure. In such case, it is required to feather the blades 8 using the gas pressure of the accumulator 49, because the oil pump 41 as an oil pressure source is down.

As shown in FIG. 3, the first emergency valve 73a and the second emergency valve 73b are configured to open when not energizing, and the pitch control valve 67 is configured to keep its neutral position when not energizing. Thus, in such emergency case, the operating oil is supplied to the oil chamber 33a through the first emergency valve 73a and the second emergency valve 73b, and the operating oil within the oil chamber 33b is exhausted, whereby the blades 8 are switched to the feathering state.

(Control Device)

Figure 5:
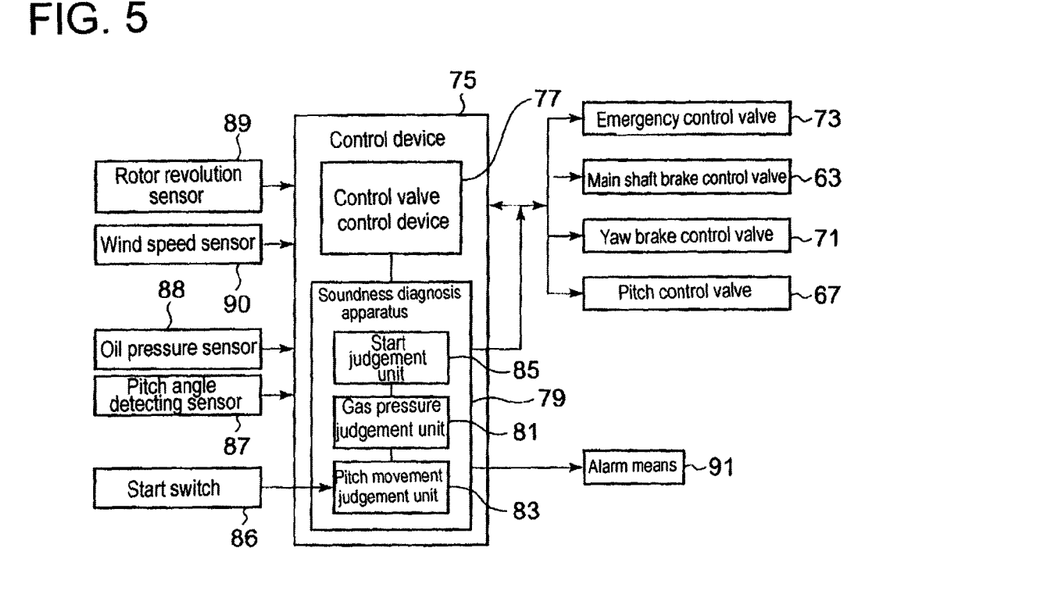
FIG. 5 is a block diagram showing the overall construction of a control device.

As shown in FIG. 5, the wind turbine generator 1 is provided with a control device 75 that includes a control valve control apparatus 77 for controlling the main shaft brake control valve 63, the pitch control valve 67, the yaw brake control valve 71 and the emergency valve 73 (73a, 73b), and a soundness diagnosis apparatus 79 for diagnosing soundness of the gas pressure state of the gas chamber 51 of the accumulator 49 and the pitch movement of the blades 8.

The soundness diagnosis apparatus 79 comprises a gas pressure judgment unit 85 for judging a soundness of the gas pressure of the gas chamber 51 of the accumulator 49; a pitch movement judgment unit 83 for judging a soundness whether the pitch driving cylinder 33 performs the right pitch movement by the pressurized operating oil stored in the accumulator 49 when the gas pressure judgment unit 81 judges that the gas pressure is sound. The soundness diagnosis apparatus 79 further comprises a start judgment unit 85 for judging whether the gas pressure judgment unit 81 should be started. In the start judgment unit 81, a start flag to start the gas pressure judgment unit is set every time when a predetermined period (for example, every 24 hours) elapses or when a start switch 86 is turned ON by the operator.

Signals from a pitch angle detecting sensor 87 and an oil pressure sensor 88 provided in the oil passage between the accumulator 49 and the branch portion. P1 are input to the soundness diagnosis apparatus 79 for the gas pressure judgment unit 81 and pitch movement judgment unit 83. A rotational speed signal from a rotor revolution sensor 89 and a wind speed signal from a wind speed sensor 90 are further input to the soundness diagnosis apparatus 79.

A control of the soundness diagnosis apparatus 79 will be described based on the control apparatus 75 and the oil pressure supply device 40 with reference to a flowchart shown in FIG. 6.

Figure 6:
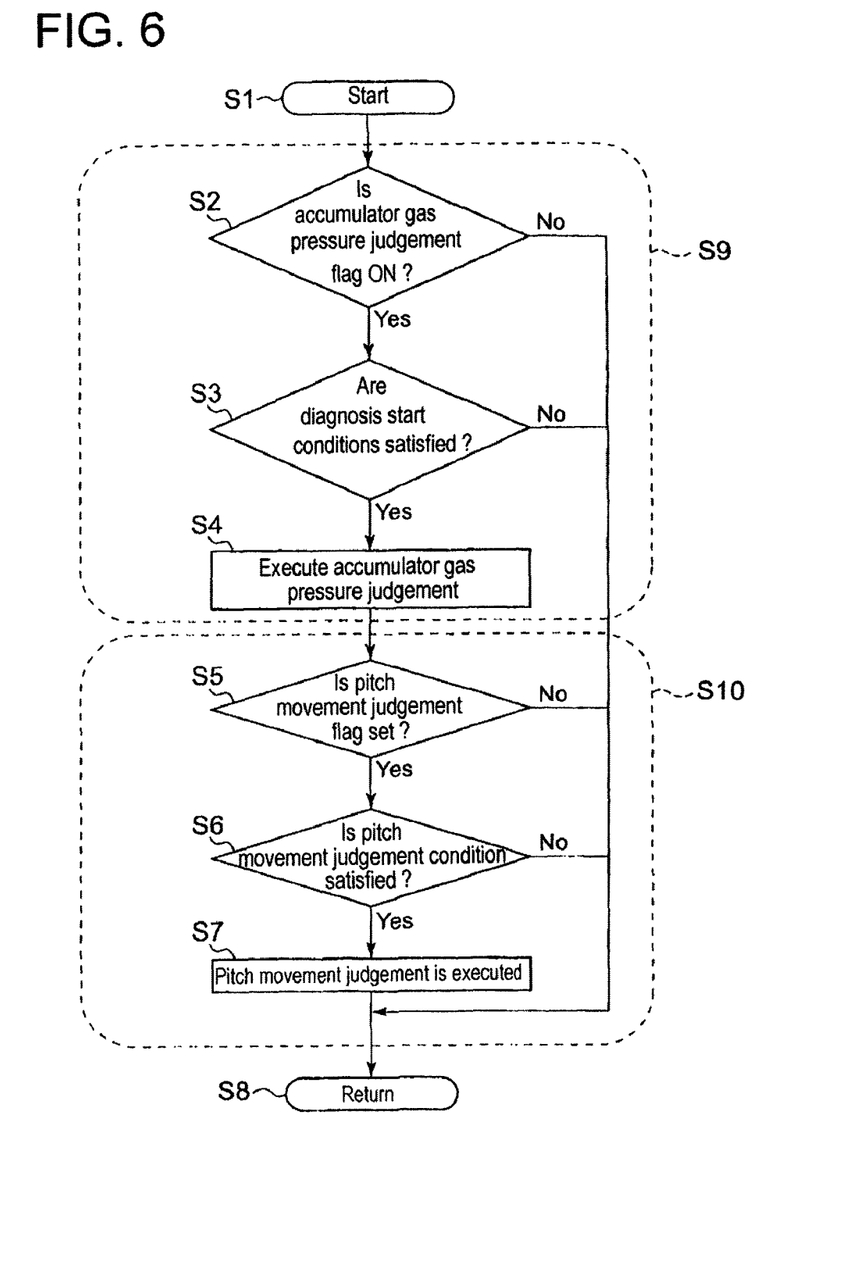
FIG. 6 is a flowchart showing control of a soundness diagnosis apparatus.

The flowchart of FIG. 6 shows overall flow of the soundness diagnosis apparatus 79. When the control of the soundness diagnosis apparatus 79 was started in step S1, the start judgment unit 85 judges at first in step S2 whether an accumulator gas pressure judgment flag for starting judgment of the gas pressure in the gas chamber 51 of the accumulator 49 is set or not.

Figure 7:
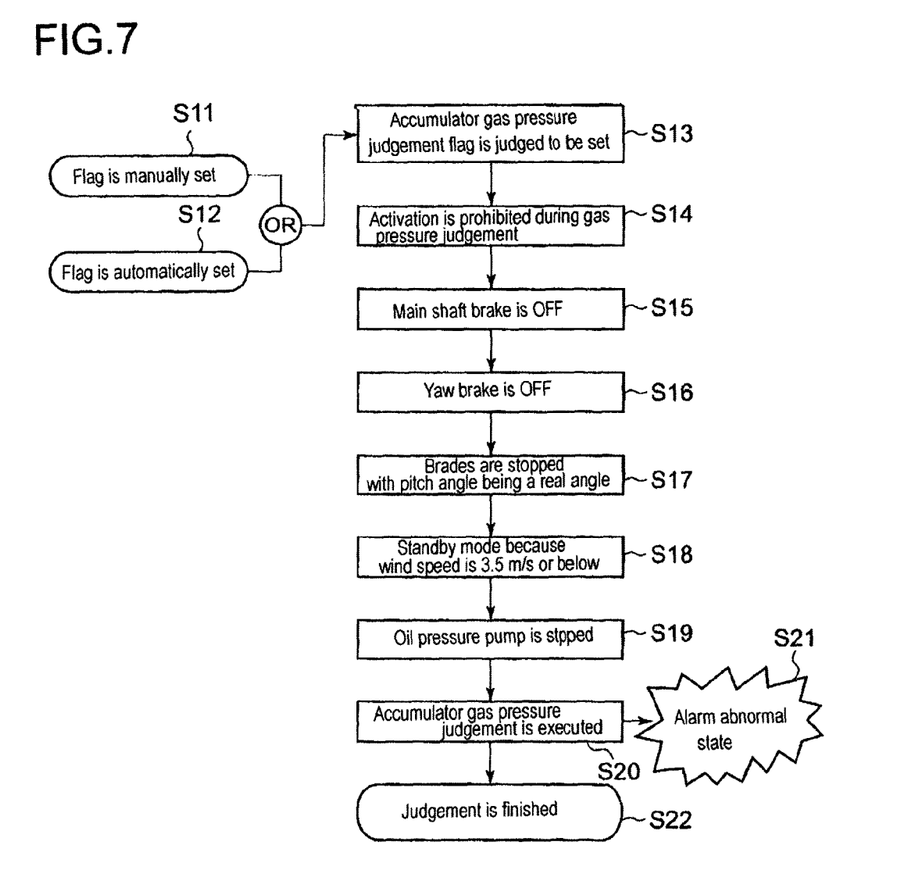
FIG. 7 is a flowchart showing a process of an accumulator gas pressure judgment.

As shown in FIG. 7, the accumulator gas pressure judgment flag is automatically set every 24 hours (S11), or manually set based on an ON operating signal of the starting switch 86 (S12) by the operator.

If the accumulator gas pressure judgment flag is judged to be set (S13), then the start judgment unit 85 judges whether diagnosis start conditions are satisfied or not in step S3. As shown in FIG. 7, the diagnosis start conditions include, for example, activation of the wind turbine generator 1 is being prohibited (S14), the main shaft brake device 19 is in OFF state (S15), the yaw brake device is in OFF state (S16), the blades 8 are stopped with the pitch angle being a real angle (S17), or the generator is in a standby mode because the wind speed is 3.5 m/s or below, etc. If all of these conditions are satisfied, then the start judgment unit 85 judges the diagnosis start conditions are satisfied to execute the accumulator gas pressure judgment in step S4.

This gas pressure judgment of the accumulator 49 is executed (S20) after the oil pump 41 is stopped (S19). For example, if the pressure value detected by an oil pressure sensor 88 provided in the oil passage near the accumulator 49 decreased to a threshold pressure or below at the time 120 seconds after stopping the pump 41, then the gas pressure judgment unit 81 judges the decreasing rate of the oil pressure caused by the oil return to the operating oil tank 43 is large and therefore an accumulating function of the accumulator 49 is not in the normal state. Then, the gas pressure judgment unit 81 alarms the abnormal state (S21).

Instead, the gas pressure judgment 81 may judge the accumulator is in the normal state if the time period from the time point when the oil pump 41 was stopped to the time point when the detected oil pressure value decreased to a predetermined pressure is longer than a predetermined threshold time.

Thus, the soundness of the gas pressure within the gas chamber 51 of the accumulator 49 can be judged without complicating the soundness diagnosis apparatus, since the gas pressure judgment 81 judges based on the decreasing state of the oil pressure.

More specifically, as shown in FIG. 3, the pitch control valve 67 is switched to a port A, the first emergency valve 73a is activated to be switched to a port C, and the second emergency valve 73b is deactivated to be positioned at a port E, and thereby the return passage to the operating oil tank 43 is formed. Then, after stopping the oil pump 41, the pressurized operating oil within the accumulator 49 is returned to the operating oil tank 43 through the port A of the pitch control valve 67 and the port E of the second emergency valve 73, and thereby the pressure of the accumulator 49 and oil passage is decreasing.

This decreasing state of the oil pressure is detected by the oil pressure sensor 88. The detected value of the oil pressure sensor 88 shows a trend to decrease slowly in process that the gas chamber 51 of the accumulator 49 is expanding, and to decrease sharply after the gas chamber 51 of the accumulator 49 completed to expand. If the gas pressure is leaked because of the failure of the gas chamber 51, the expanding action of the gas chamber 51 is not enough so that the detected value of the oil pressure sensor 88 has a trend to decrease early. Thus, it is possible to diagnose the state of the gas pressure of the gas chamber 51 by detecting the change of the oil pressure.

Preferably, the oil pump 41 is stopped with a pressure higher than that in the normal operation of the wind turbine generator 1, when the gas pressure judgment of the accumulator 49 is executed. Namely, the higher pressure makes it possible to judge the oil pressure decreasing state more accurately at the time 120 seconds after stopping the oil pump 41, and therefore it is possible to judge the deterioration of the accumulating performance of the accumulator 49 accurately. For example, if the control pressure is 3 MPa under the normal operation of the wind turbine generator 1, the oil pump 41 is driven with 5 MPa of the control pressure and then stops to judge the oil pressure decreasing state by the oil pressure sensor 88.

The judgment of the soundness of the gas pressure by the gas pressure judgment unit 81 is executed under the condition in which supply of the oil pressure to the yaw brake device 29 for braking the yaw rotation, the main shaft brake device 19 and the pitch drive cylinder 33 of the pitch control unit 30 is stopped, thereby the judgment is executed in the same condition. Thus, it is possible to make the oil returning state the same condition in the judgment so that the gas pressure judgment unit 81 can judge the deterioration of the accumulating performance of the accumulator 49 caused by leakage of the gas pressure from the gas chamber 51, more accurately.

Next, the pitch movement judgment unit 83 judge whether the pitch movement judgment flag is set or not in step S5 of the flowchart shown in FIG. 6.

Specifically, the pitch movement judgment flag is automatically set every 7 days, or manually set based on an operating signal that the operator turns on the starting switch 86. If the pitch movement judgment flag is judged to be set in step S5, then the pitch movement judgment unit 83 whether a pitch movement judgment start condition is satisfied or not in step S6. The pitch movement judgment start condition includes, for example, a condition that the gas pressure judgment in steps S2 to S4 is completed, and a condition that the result of the judgment shows that the accumulator gas pressure is not decreased. If the pitch movement judgment condition is judged to be satisfied in step S6, the pitch movement judgment is executed in step S7 and then return to step S1 so as to repeat the same processes.

As described above, steps S2 to S4 are processes of the accumulator gas pressure judgment step S9, and if the result of the judgment by the step S9 is normal then a pitch movement judgment step S10 including steps S5 to s7 is executed.

Figure 8:
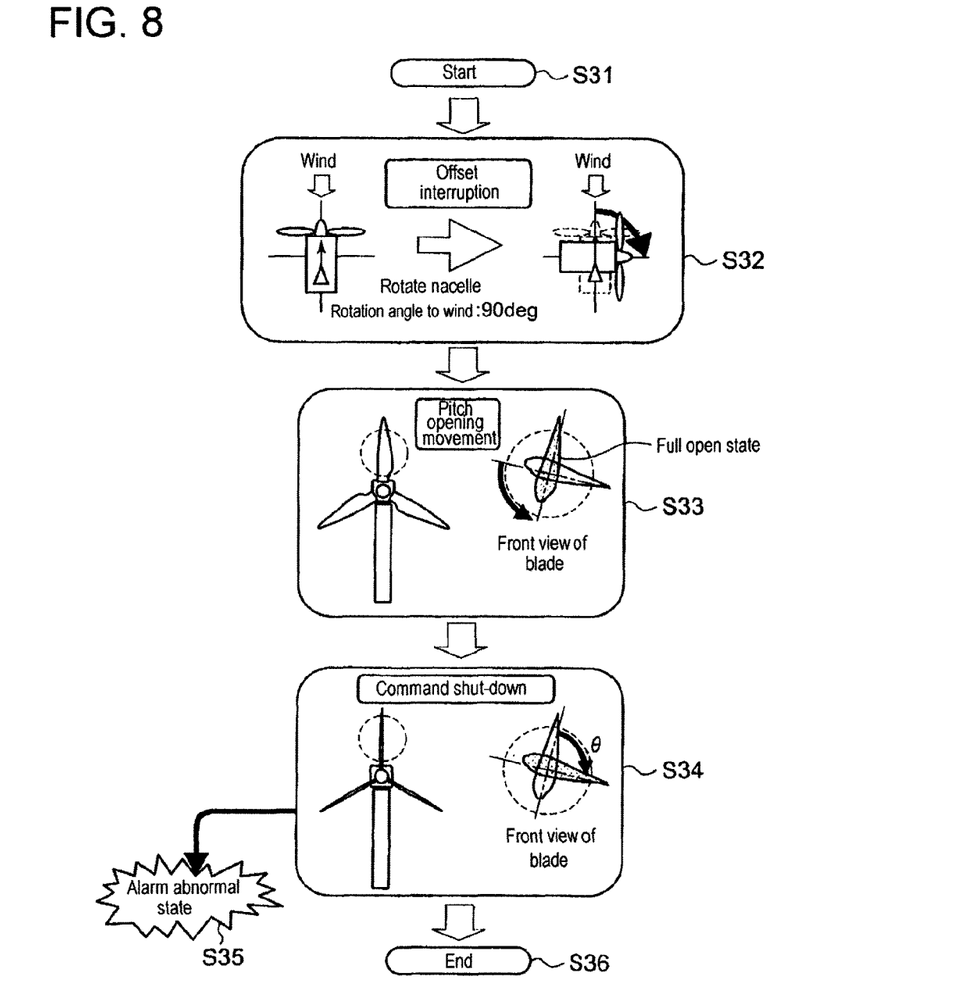
FIG. 8 is a flowchart showing a process of a pitch movement judgment.

In the pitch movement judgment by the pitch movement judgment unit 83, an offset interruption action is performed at first in step S32. The offset interruption action is to rotate the nacelle 4 approximately 90 degrees to the wind in the yaw direction, in other words, to place each rotational surface of the blades in parallel with the wind. Further, the yaw brake control valve 71 and the main shaft brake control valve 63 are controlled to turn ON the yaw brake device 29 and the main shaft brake device 19.

Thus, the nacelle 4 is rotated approximately 90 degrees to the wind in the yaw direction so as to dodge the wind, and further the yaw brake device 29 and the main shaft brake device 19 are turned on. Thereby, the influence of the wind against the pitch motion of the blades 8 and the influence of the rotation of the rotor are decreased as much as possible, and therefore an accurate judgment of the pitch movement can be realized.

Next, in step S33, a pitch opening control is performed to rotate the blades 8 to the maximum angle (full open) in its fine direction by the operating oil pressure of the oil pump 41. In this control, the pitch control valve 67 is switched to the port A, the first emergency valve 73a is activated to be switched to the port C, and the second emergency valve 73b is activated to be switched to the port F. Thus, the pitch driving cylinder 33 is driven to its full opening state by the oil pressure of the oil pump 41.

Then, a shut down control for stopping the oil pump 41 is performed in step S34. In the shut down control, the pitch control valve 67 is switched to its neutral position to block the operating oil flown to the pitch driving cylinder 33, and the first emergency valve 73a and the second emergency valve 73b are deactivated to position the first emergency valve 73a to a port D and the second emergency valve 73b to a port F, respectively.

Then, after stopping the oil pump 41, the pressurized operating oil within the accumulator 49 is supplied to the oil chamber 33a of the pitch driving cylinder 33, while the operating oil is exhausted from the oil chamber 33b, whereby the pitch driving cylinder rotates the blades 8 to the feather direction (close direction). Thus, the blades 8 being in the full open state are rotated to the feather direction by the pressurized operating oil accumulated in the accumulator 49. The pitch movement judgment unit 83 judges the soundness of the pitch movement based on the closing movement state of the blades 8 after stopping the oil pump 41.

Figure 9:
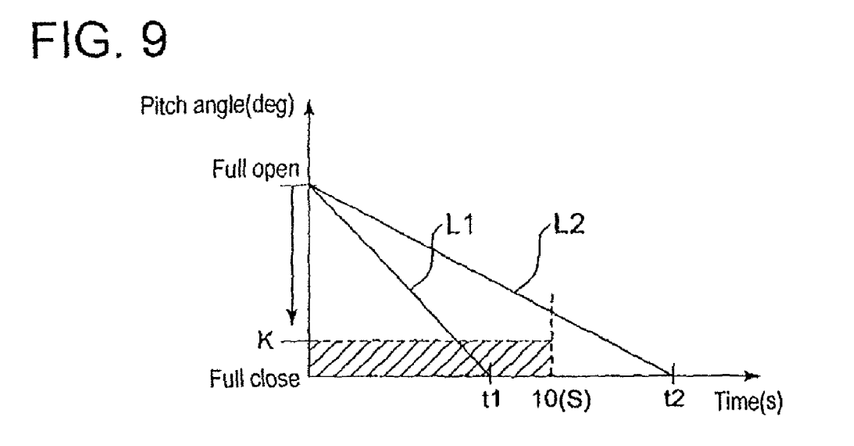
FIG. 9 is a graphic diagram showing a judgment threshold value in the pitch movement judgment.

For example, as shown in FIG. 9, the pitch movement judgment unit 83 can judge based on whether the changing amount of the pitch angle of the blades 8 toward the closing direction reaches over a threshold angle K 10 seconds after stopping the oil pump 41. The pitch movement judgment unit 83 judges that the pitch movement of the blades 8 is in abnormal state if the changing amount does not reach the threshold angle K.

In this such case, the pitch movement as indicated by the Line 1 is judged normal and the pitch movement as indicated by the line L2 is abnormal. Instead, it is possible to judge based on whether the time period (for example, t1, t2) in which the blades 8 rotate to the feather state after stopping the oil pump 41 is longer than a threshold time period.

Then, if the pitch movement of the blades 8 is judged abnormal in step S34, there is a high possibility of mechanical fastening for the pitching movement of the blade, and therefore the pitch movement judgment unit 83 alarms the abnormal state in step S35. If the pitch movement of the blades 8 is judged normal in step S34, the process is ended in step S36.

As mentioned above, in the present embodiment of the invention, while the accumulator 49 is provided in the oil passage of the oil pressure supply device 40 as an interlock mechanism (safety arrangement) for the oil pressure supply device 40, the soundness of the accumulator 49 and the soundness of the pitch movement of the blades 8 are diagnosed. Thus, the risk such that the pitch closing control cannot work normally because of the decreasing of the gas pressure of the accumulator 49 or the mechanical fastening of the pitch movement in emergency is reduced, and therefore it is possible to improve the reliability of the operation of the wind turbine generator 1.

INDUSTRIAL APPLICABILITY

In the invention, while the accumulator is provided as an interlock mechanism (safety arrangement) in the oil passage of the oil pressure supply device for the oil pressure supply device, the soundness of the accumulator and the soundness of the pitch movement of the blades are diagnosed. Thus, the pitch closing function can normally work by the gas pressure of the accumulator in emergency, and thereby the risk such that the pitch closing control cannot work normally in an emergency is reduced. Accordingly, the reliability of the operation of the wind turbine generator can be improved, and therefore the present invention is suitable to use in a wind turbine generator.

The invention claimed is:

1. A wind turbine generator, comprising blades,
   a pitch control unit having an oil actuator for controlling a pitch of the blades,
   an oil pump for supplying operating oil to the oil actuator,
   an accumulator having an oil chamber in which the operating oil pressurized by the oil pump is stored, and a gas chamber filled with gas and expandable or contractable, the oil chamber and the gas chamber being divided by a partition, and
   a soundness diagnosis device,
   wherein the diagnosis device includes:
   a gas pressure judgment unit configured to judge soundness on the gas pressure of the gas chamber of the accumulator by comparing an oil pressure value detected by an oil pressure sensor provided in an oil circuit with a predetermined threshold after stopping the oil pump;
   a pitch movement judgment unit configured to judge, when the gas pressure judgement unit that the gas pressure is sound, soundness of a pitch movement of the pitch control unit based on whether a changing amount of a pitch angle by the pitch movement by the pressurized operating oil accumulated in the accumulator reaches over a predetermined threshold; and
   a start judgment unit configured to judge whether to start the gas pressure judgement unit by judging whether start conditions preliminarily determined for parts of the wind turbine generator are satisfied during every predetermined period or when a start switch is operated.

2. A wind turbine generator according to claim 1, wherein the gas pressure judgment unit is configured to judge the soundness on the gas pressure of the gas chamber based on a time period from a time point when the oil pump is stopped to a time point when the oil pressure is decreased to a predetermined pressure.

3. A wind turbine generator according to claim 1, wherein the gas pressure judgment unit is configured to judge the soundness on the gas pressure of the gas chamber based on the oil pressure value when a predetermined time period elapses after the oil pump is stopped.

4. A wind turbine generator according to claim 1, wherein the as pressure judgement unit is configured to judge the soundness of the gas pressure under conditions in which a yaw brake device for braking yaw movement of a nacelle of the generator, a main shaft brake for braking a rotational shaft of a rotor of the generator, and the oil actuator of the pitch control unit are stopped to be supplied with the oil pressure.

5. A wind turbine generator according to claim 1, wherein the pitch movement judgment unit is configured to judge the soundness of the pitch movement of the pitch control unit based on a moving time when the blades are moved by the pressurized oil accumulated in the accumulator from a full opening state after the oil pump is stopped to a full closing state.

6. A wind turbine generator according to claim 5, wherein each rotational surface of the blades is configured to be placed in parallel with the wind, and a yaw brake for braking a yaw movement of a nacelle of the generator and a main shaft brake for braking a rotational shaft of a rotor of the generator are configured to be turned ON, when the pitch movement judgment unit judges that pitch movement is sound.

7. A soundness diagnosis method for a wind turbine generator comprising a pitch control unit having an oil actuator and an oil pump for supplying operating oil to the oil actuator of the pitch control unit, and an accumulator having an oil chamber in which the operating oil pressurized by the oil pump is stored, and a gas chamber filled with gas and expandable or contractable, the oil chamber and the gas chamber being divided by a partition,
said method comprising:
   a start judgment step of judging a start condition to start a gas pressure judgment unit every predetermined period or when a start switch is operated;

a gas pressure judgment step of judging soundness on a gas pressure of the gas chamber of the accumulator provided in an oil circuit of the pressure supply device and having an oil chamber for accumulating a pressure generated by an oil pump of the oil supply device if the start condition is met in the start judgment step; and a pitch movement judgment step of judging soundness of a pitch movement of the pitch control unit by the pressurized operating oil accumulated in the accumulator if the gas pressure is judged as being sound in the gas pressure judgment step.

8. A soundness diagnosis method for a wind turbine generator according to claim 7, wherein, in the gas pressure judgment step, oil supply to a yaw brake device for braking yaw movement of a nacelle of the generator, a main shaft brake for braking a rotational shaft of a rotor of the generator, and an oil cylinder of the pitch control unit is blocked, and then the oil pump is stopped and the soundness of the gas pressure is judged based on a time period from the time point when the oil pump is stopped to a time point when the oil pressure is decreased to a predetermined pressure.

9. A soundness diagnosis method for a wind turbine generator according to claim 7, wherein, in the gas pressure judgment step, oil supply to a yaw brake device for braking yaw movement of a nacelle of the generator, a main shaft brake for braking a rotational shaft of a rotor of the generator, and an oil cylinder of the pitch control unit is blocked, then the oil pump is stopped, and the soundness of the gas pressure is judged based on the oil pressure when a predetermined time period elapses after the oil pump is stopped.

10. A soundness diagnosis method for a wind turbine generator according to claim 7, wherein, in the pitch movement judgment step, each rotational surface of the blades is placed in parallel with the wind to ward off the wind, a yaw brake for braking a yaw movement of a nacelle of the generator and a main shaft brake for braking a rotational shaft of a rotor of the generator are turned ON, the blades are moved to a full open position by the oil pressure of the oil pump, and then while the pump is stopped and the blades are moved to a full close position by the oil pressure accumulated in the accumulator, the soundness of the pitch movement is judged based on a time period during which the blades are moved from the full open position to the full close position.

* * * * *